US008195607B2

(12) United States Patent
Hansen et al.

(10) Patent No.: US 8,195,607 B2
(45) Date of Patent: Jun. 5, 2012

(54) FAIL OVER RESOURCE MANAGER ACCESS IN A CONTENT MANAGEMENT SYSTEM

(75) Inventors: Lynda A. Hansen, San Jose, CA (US); Mang-rong Ho, San Jose, CA (US); Gerald E. Kozina, Cupertino, CA (US); Kenneth Carlin Nelson, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 11/848,834

(22) Filed: Aug. 31, 2007

(65) Prior Publication Data

US 2007/0294290 A1    Dec. 20, 2007

Related U.S. Application Data

(62) Division of application No. 10/327,059, filed on Dec. 24, 2002, now Pat. No. 7,792,797.

(51) Int. Cl.
*G06F 17/00* (2006.01)

(52) U.S. Cl. ........................................ 707/626; 707/634

(58) Field of Classification Search .................. 707/204, 707/626
See application file for complete search history.

(56) References Cited

U.S. PATENT DOCUMENTS

| | | | |
|---|---|---|---|
| 4,432,057 A | 2/1984 | Daniell et al. | |
| 5,220,665 A | 6/1993 | Coyle et al. | |
| 5,574,900 A | 11/1996 | Huang et al. | |
| 5,649,185 A | 7/1997 | Antognini et al. | |
| 5,960,426 A | 9/1999 | Pirahesh et al. | |
| 6,044,373 A | 3/2000 | Gladney et al. | |
| 6,202,149 B1 | 3/2001 | Hedegard | |
| 6,263,433 B1 | 7/2001 | Robinson et al. | |
| 6,640,278 B1 * | 10/2003 | Nolan et al. | 711/6 |
| 6,735,741 B1 * | 5/2004 | Pannu | 715/234 |
| 6,873,995 B2 | 3/2005 | Benson et al. | |
| 7,039,827 B2 * | 5/2006 | Meyer et al. | 714/4 |
| 7,058,731 B2 * | 6/2006 | Kodama | 710/5 |
| 2002/0194015 A1 * | 12/2002 | Gordon et al. | 705/1 |
| 2006/0117212 A1 * | 6/2006 | Meyer et al. | 714/4 |
| 2007/0226220 A1 * | 9/2007 | Aronoff et al. | 707/8 |

* cited by examiner

*Primary Examiner* — Angela M Lie
*Assistant Examiner* — Mellissa M Chojnacki
(74) *Attorney, Agent, or Firm* — Sughrue Mion, PLLC (57) ABSTRACT

In a content management system having a plurality of resource managers storing objects, a replica resource manager stores a replica of an object stored in one of the plurality of resource managers. A library server contains a resource manager table that defines the plurality of resource managers and includes availability information for each of those resource managers. When a client requests an object, the library server identifies a primary resource manager storing the object. The library server also determines a replica resource manager storing a replica of the object and returns information identifying that replica resource manager if the resource manager table indicates that the primary resource manager is unavailable and indicates that the replica resource manager is online and available. The client then retrieves the replica object without incurring a timeout delay waiting for the primary resource manager to respond to an access request.

20 Claims, 7 Drawing Sheets

FIG.1

| ITEM ID /28 | ATTRIBUTES /30 | PRIMARY RM ID /32 | COLLECTION ID /34 | RESOURCE FLAGS /36 |
|---|---|---|---|---|
| ⋮ | ⋮ | ⋮ | ⋮ | ⋮ |
| ITEM_A | --- | RM 1 | C1 | 11 |
| ITEM_B | --- | RM 2 | C2 | 10 |
| ITEM_C | --- | RM 1 | C2 | 00 |
| ⋮ | ⋮ | ⋮ | ⋮ | ⋮ |

COMPONENT TABLE

FIG.2

| RM ID /40 | RM ADDRESS /42 | AVAILABILITY /44 | OTHER ATTRIBUTES /46 |
|---|---|---|---|
| RM 1 | 192.173.8.7 | AVAILABLE | |
| RM 2 | 192.173.3.1 | UNAVAILABLE | |
| RM 3 | 194.217.6.7 | OFFLINE | |
| ⋮ | ⋮ | ⋮ | |

RESOURCE MANAGER TABLE

FIG.3

REPLICAS TABLE

| ITEM ID | REPLICA RM ID | COLLECTION ID | RESOURCE FLAGS |
|---|---|---|---|
| ⋮ | ⋮ | ⋮ | ⋮ |
| ITEM_A | RM 1 | C2 | 1 |
| ITEM_A | RM 2 | C3 | 0 |
| ITEM_B | RM 9 | C19 | 0 |
| ⋮ | ⋮ | ⋮ | ⋮ |

FIG.4

REPLICA RULES

| SOURCE RM | TARGET RM |
|---|---|
| ⋮ | ⋮ |
| RM 1/C1 | RM 1/C2 |
| RM 1/C1 | RM 2/C3 |
| RM 2/C2 | RM 9/C19 |
| ⋮ | ⋮ |

FAIL OVER RESOURCE MANAGER ACCESS IN A CONTENT MANAGEMENT SYSTEM

CROSS REFERENCE TO RELATED APPLICATIONS

This is a divisional application of application Ser. No. 10/327,059, filed Dec. 24, 2002.

BACKGROUND OF THE INVENTION

1. Field of the Invention

The invention relates generally to a content management system. More particularly, it relates to systems and methods for locating an available resource manager in which to store an object in a content management system.

2. Description of the Related Art

A content management system is a computer-based infrastructure for managing the full spectrum of digital information. Large collections of scanned images, facsimiles, electronic office documents, XML and HTML files, computer output, audio, video, multimedia, and virtual reality content can be stored and accessed through the content management system. The content management system integrates content with line of business, customer service, enterprise resource planning (ERP), digital asset management, distance learning, World-Wide Web ("Web") content management or other applications to accelerate benefits across the enterprise.

One instance of such a content manager system can be visualized as a triangle, its three vertices being the client, a library server and an object server (resource manager). The client includes an application programming interface (API) that provides an interface for a user's application program with the content management system. Through the client API the user's application program can store, search for, and mark-up documents or other objects in the content management system. The library server is the equivalent of a card catalog which holds information about the objects, including their location. The object server (OS), also referred to as a resource manager (RM), is where either the actual object or a pointer to the actual object is stored.

The core library server logic (except for system utilities and housekeeping tasks) is packaged as a set of relational data base (RDB) stored procedures (SPs) containing embedded SQL statements. Each stored procedure is precompiled and runs on a relational database server. Thus, each library server process is a relational database server process. The interface to a library server is SQL, through which either stored procedures can be called or SQL SELECT statements (including cursor support) can be executed. Remote access to the library server is via a relational database client.

The resource managers can support different/multiple access protocols. For example, the resource manager, or object server, supports the HTTP protocol. The basic information entities managed by the library server are items. Items come in two types, simple items and resource items. Resource items can have content associated with them that is stored in one or more resource managers. Resource items point to their content via resource uniform resource locator (URL) related data.

The library server and resource manager are separate processes, often running on different machines. In operation, a client application program first contacts the library server to create or update an index for an object, and to determine where the object is to be stored/replaced. The client then sends a request to the resource manager to store or replace the object.

Although content management systems are used to store a copy of an object in a resource manager, often it is desired that multiple replicas of an object on different resource managers be resident within the system. Replication provides for reliability in a variety of ways. For example, it can be utilized as part of a comprehensive data security model to provide offsite storage. In addition, replicated items lost due to a hardware, software or administrative error can be recovered by a utility if a copy exists. It also provides for availability of objects. For business, legal or regulatory reasons (depending on locale) objects (possibly legal documents) may be required to reside on certain classes of media, such as optical media.

The performance characteristics of this media may conflict with the desired access rate for a given customer. Replication to a faster media can enable keeping a copy on the legal storage medium and a copy on fast access medium over a longer defined period than normal caching practices permit. Replication also provides backup redundancy, the ability to maintain a copy at two or more sites. Higher availability of objects is also achieved via multiple peer copies.

Such content management system replication features are described in U.S. patent application Ser. No. 10/011,181, filed on Nov. 9, 2001, which is incorporated by reference herein. With these replication features comes the capability to specify a primary resource manager (RM), and one or more replica resource managers. When an object is stored to the primary RM, a list of replica RMs is also sent to the primary RM. An asynchronous process is then used to copy the content to any replica RMs. If the primary is not available as detected by a timeout error, the content and list of RMs is sent to the first available replica RM. Again, an asynchronous process is used to copy the object to the primary RM and to any other replica RMs.

In these prior content management systems, each copy request had to wait for a timeout period, which could take minutes, and in certain circumstances can impact the productivity of users. Accordingly, there is a need to support replication in a content management system without requiring a user to wait for a timeout period to expire before storing or retrieving an item in or from a replica resource manager.

SUMMARY OF THE INVENTION

The present invention provides an automatic fail-over capability to locate and access an available replica resource manager. This fail-over capability avoids a user from having to endure a timeout period for detecting that a primary resource manager is not available. Additionally, a mechanism is introduced for a system administrator to indicate that a resource manager should be considered unavailable or taken off-line, thereby eliminating the timeout wait for even a single user.

An embodiment of the invention relates to a method of accessing a replica of an object in a content management system, in which the object is stored in a resource manager and the replica of the object is stored in a replica resource manager. The method includes determining if the resource manager is available in response to receiving a request for the object from a requester. If the resource manager is determined to be unavailable, then the replica resource manager is identified. A response is then sent to the requester with information identifying the replica resource manager.

Features and advantages of the invention will become apparent upon consideration of the following descriptions and descriptive figures of specific embodiments thereof. While these descriptions go into specific details of the inven-

DETAILED DESCRIPTION

The embodiments described below are described with reference to the above drawings, in which like reference numerals designate like components.

Generally, the conventional content management system is enhanced by avoiding the need for a user to wait for a timeout to occur before accessing a replica resource manager. This capability can be achieved by extending the resource manager definition to include status information concerning whether a resource manager (RM) is designated as offline, and if it is not, whether it is available for use. The resource manager definition is extended by including an RM Status flag. For a resource manager that has been explicitly marked offline by the administrator and should not be used by the client API layer, the RM status flag is set to "offline." If the resource manager is online but cannot be reached by the library server, the RM status flag is set to "unavailable."

The client API includes Create and Update interfaces to the library server. In response to a client application program calling these interfaces, each returns the address of the first resource manager that is designated as online and is marked available. If none are available but one is online, that address of that resource manager is returned. If none are online, an error is returned.

The client API also includes a Retrieve interface to the library server. In response to a client application program calling that interface, the address of the first resource manager that contains the requested object, is designated as online and is marked available, is returned. If none are available but one is online, the address of that resource manager is returned. If none are online, an error is returned.

If the request is for a Store or Replace operation, the client API then attempts to use the first replica resource manager that is designated as online and is marked available.

If the request is for a Retrieve operation, the client API layer attempts to use the first available or online replica resource manager that contains a copy of the requested object.

Figure 1:
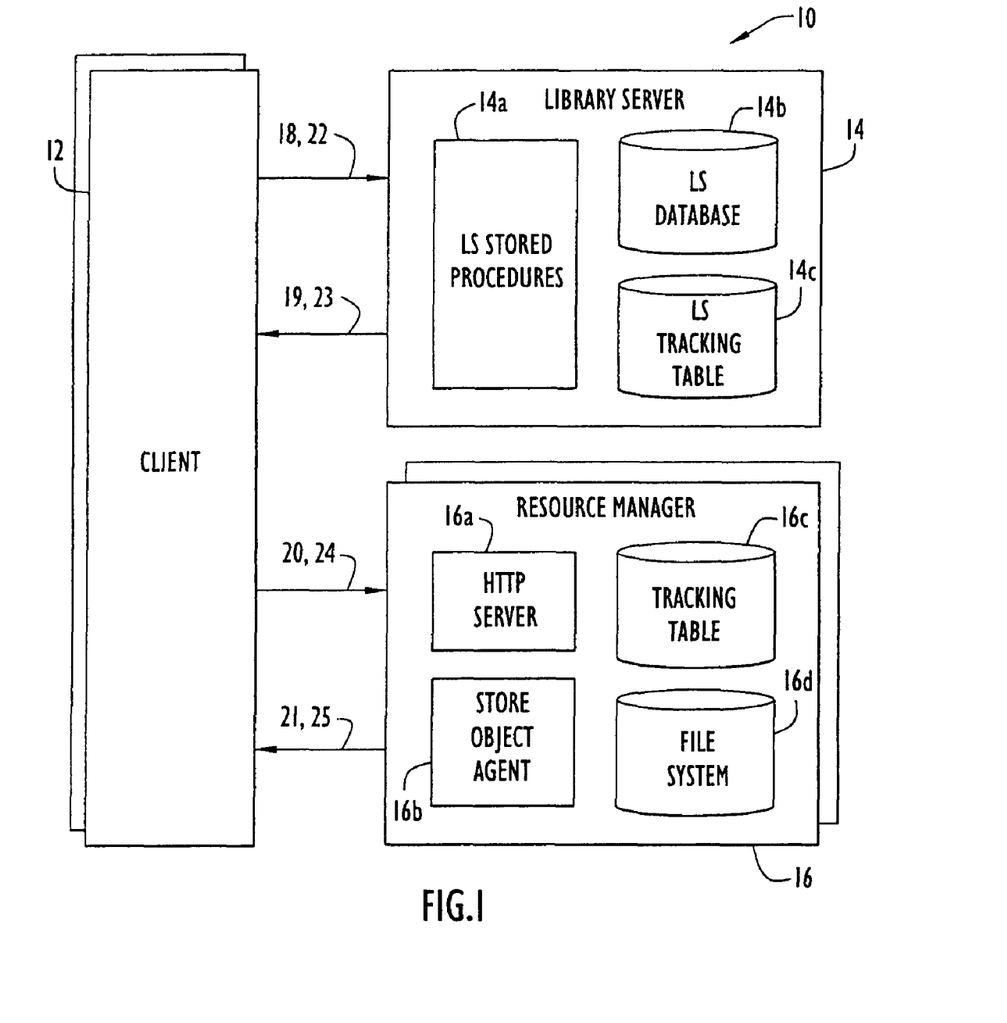
FIG. 1 is a block diagram of a content management system.
Figure 2:
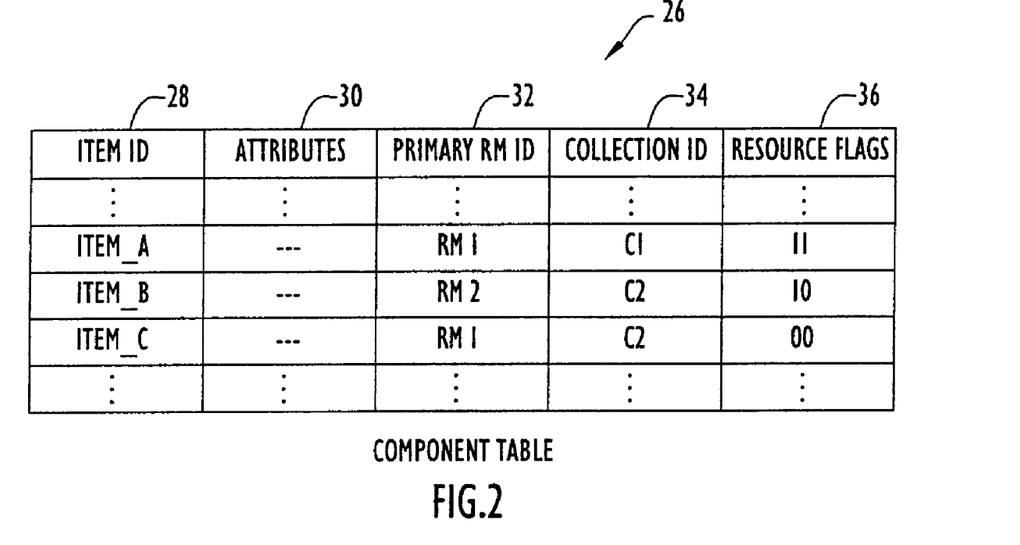
FIG. 2 illustrates a relational database table in the content management system's library server in which the table identifies components stored in the content management system and includes meta-data associated with those items.

More specifically, the content management system 10 includes a plurality of relational database tables in the library server 14. One such table is the component table 26, which is shown in FIG. 2. The component table includes a row for each item stored within the content management system. The component table can be thought of as a card catalog in a library with information about items held within the content management system. Referring to FIG. 2, the component table 30 includes an item ID column 28 that holds an identifier of an item, in which the identifier is unique throughout the content management system; an attributes column 30 that holds various attributes of the item; a primary resource manager (RM) ID column 32 that holds an identifier code for the primary resource manager on which the item is stored; a collection ID column 34 that holds an identifier of a collection within the primary resource manager where the item is stored; and a column for a set of resource flags 36 that can include a flag that indicates whether a current copy of the item exists (e.g., "1"=a copy exists, "0"=no copy exists), and a flag that indicates whether a copy is complete (e.g., "1"=copy complete, "0"=copy not complete). As shown in FIG. 2, three example items are shown, Item_A, Item_B, and Item_C. Each of these items is associated with a primary resource manager and a collection on that resource manager. Item_A, for example, resides on resource manager RM1 in collection C1.

Figure 3:
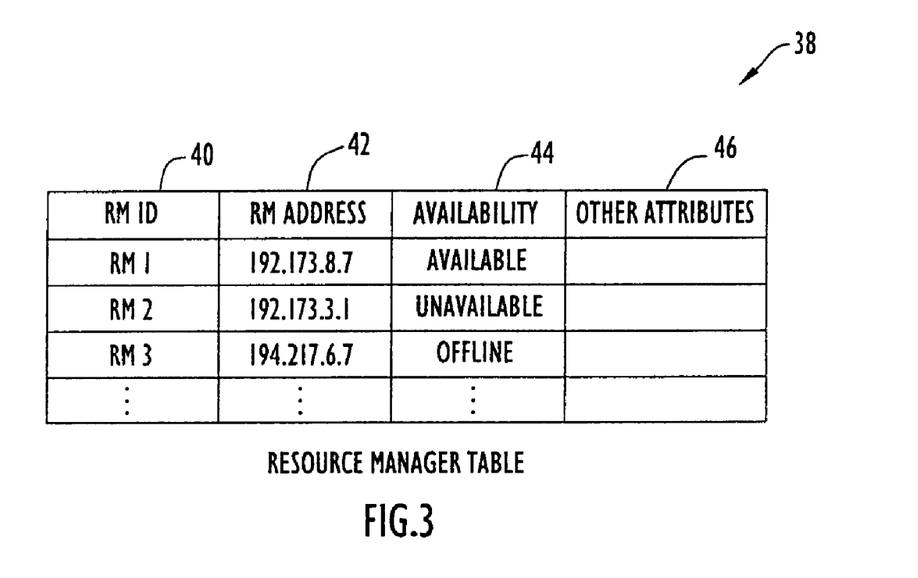
FIG. 3 illustrates a relational database table in the content management system's library server in which the table identifies resource managers in the system.

The library server 14 also includes a resource manager table 38, illustrated in FIG. 3. The resource manager table 38 includes an RM ID column 40 that holds the IDs of the resource managers within the content management system; an RM address column 42, that holds a network address of the resource manager; and one or more columns 48 for other attributes associated with the resource manager.

A new columns is added to the resource manager table, namely an availability column 44, indicating an availability status for each of the resource managers. The availability column identifies one of four states for the resource managers: available, unavailable, online, or offline. The "available" status indicates that the library server understands the resource manager to be available and ready to store and retrieve data. The "unavailable" status indicates that although the resource manager may be configured to be online, from the library server's perspective, it is unavailable for storage or retrieval. The "offline" status indicates that a system administrator has designated that resource manager to be offline such that objects may not be stored on or retrieved from the resource manager. Although FIG. 3 shows text values of "available," "offline," etc., it will be understood that these status indicators can be replaced with indicators in other forms, such a binary flags within a single column. For example one bit, or flag, in string of flags in the column can indicate a status condition such as an availability flag (e.g., "1"=available, "0"=unavailable). Another bit in the string can indicate, for example, an online/offline status (e.g., "1"=online, "0"=offline).

Figure 5:
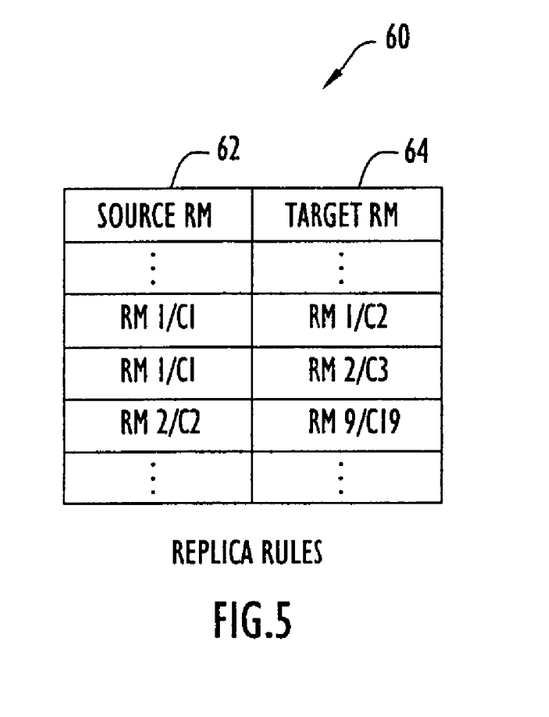
FIG. 5 illustrates a relational database table in the content management system's library server that hold replication rules for creating replica components.

As shown in FIG. 5, a resource manager/collection RM1/C1 is defined to be associated with two replica resource manager/collections, namely, RM1/C2 and RM2/C3. Resource manager/collection RM2/C2 is associated with only one replica resource manager/collection, namely, RM9/C19.

Figure 4:
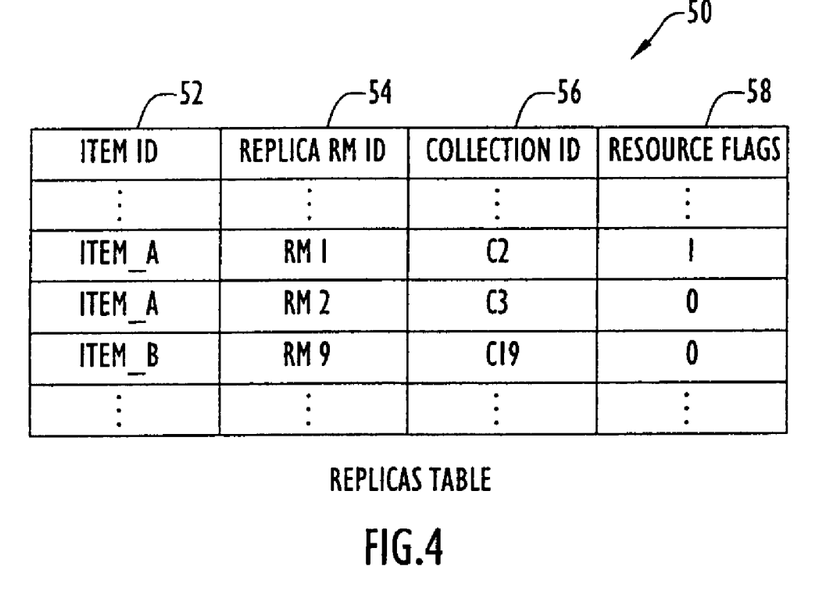
FIG. 4 illustrates a relational database table in the content management system's library server in which the table identifies replicas of components stored in the system.

A replicas table 50 is illustrated in FIG. 4. The table includes a column for Item ID 52; a replica RM ID column 54 and a collection ID column 56 indicating the RM and collection on which a replica of the item is located. The table also includes a resource flags column 58 that holds a sequence of flags concerning the replica resource manager. For example, the flag shown in column 58 indicates whether the store operation for the replica is complete (e.g., "1"=store complete; "0"=store not complete). It will be understood that other flags can be used to indicate additional information about the replica.

A replication rules table 60 is illustrated in FIG. 5. The table includes a source resource manager column 62, indicating the IDs of a resource manager and a collection that holds the item to be replicated; and a target resource manager column 64, indicating the IDs of a resource manager and a collection that will hold the replica of the item.

Figure 6:
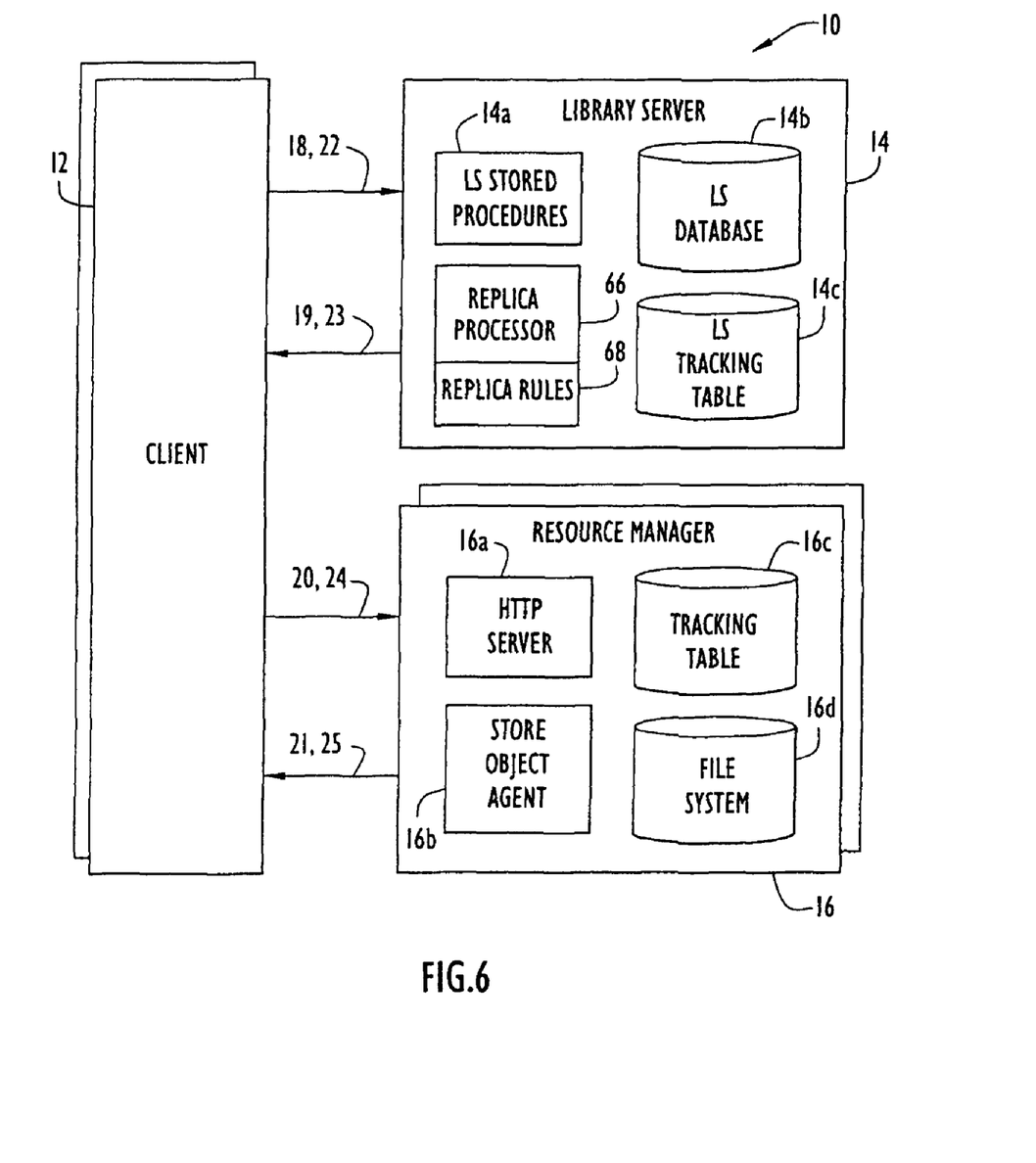
FIG. 6 is a block diagram of a content management system that supports replication and automatic fail-over of replication resource managers.

Program logic associated with handling replica resource managers is added to the library server 14, as illustrated in FIG. 6, by a replica processor unit 66 that follows replica rules 68. The replica processor unit 66 communicates with both the client applications and the various resource managers to update the replica information held within the resource manager table and to respond to requests for objects that may be held in replica resource managers. The replica processor unit 66 processes requests for replica objects according to the replica rules 68 held within the library server.

In operation, the content management system illustrated in FIG. 6 operates to store or retrieve an object from a replica resource manager without having to incur a default network timeout as in conventional content management systems. In a conventional system, if a resource manager is not available, a requester might wait for a pre-determined amount of time, defined by a default network timeout time before an error is returned. This timeout delay is defined for each server, and typically is set to two-minutes.

By keeping status information within the library catalog as to the availability of resource managers, this network timeout need not be incurred, thereby increasing the efficiency of the content management system. In response to a user requesting an object, if the resource manager on which the item resides is determined to be not available, based on the status information held on the library server, then the content management system automatically attempts to retrieve a copy of the requested object from a replica server without waiting for the timeout period to expire.

To facilitate gathering the status of the resource managers and maintaining that status in the resource manager table, the library server periodically attempts to contact all resource managers listed in the resource manager table that are not designated as offline, by querying them to determine whether each is available. The library server sets the availability status in the resource manager table according to whether a resource manager responds to the query. This querying of resource managers preferably takes place on a periodic basis, such as every 60 seconds, for example. It will be understood that other periods of time can be used for querying the on-line resource managers. If a resource manager does not respond to a query within a relatively short predetermined amount of time, such within 15 seconds of sending the query, the library server will mark that resource manager as unavailable.

Figure 7:
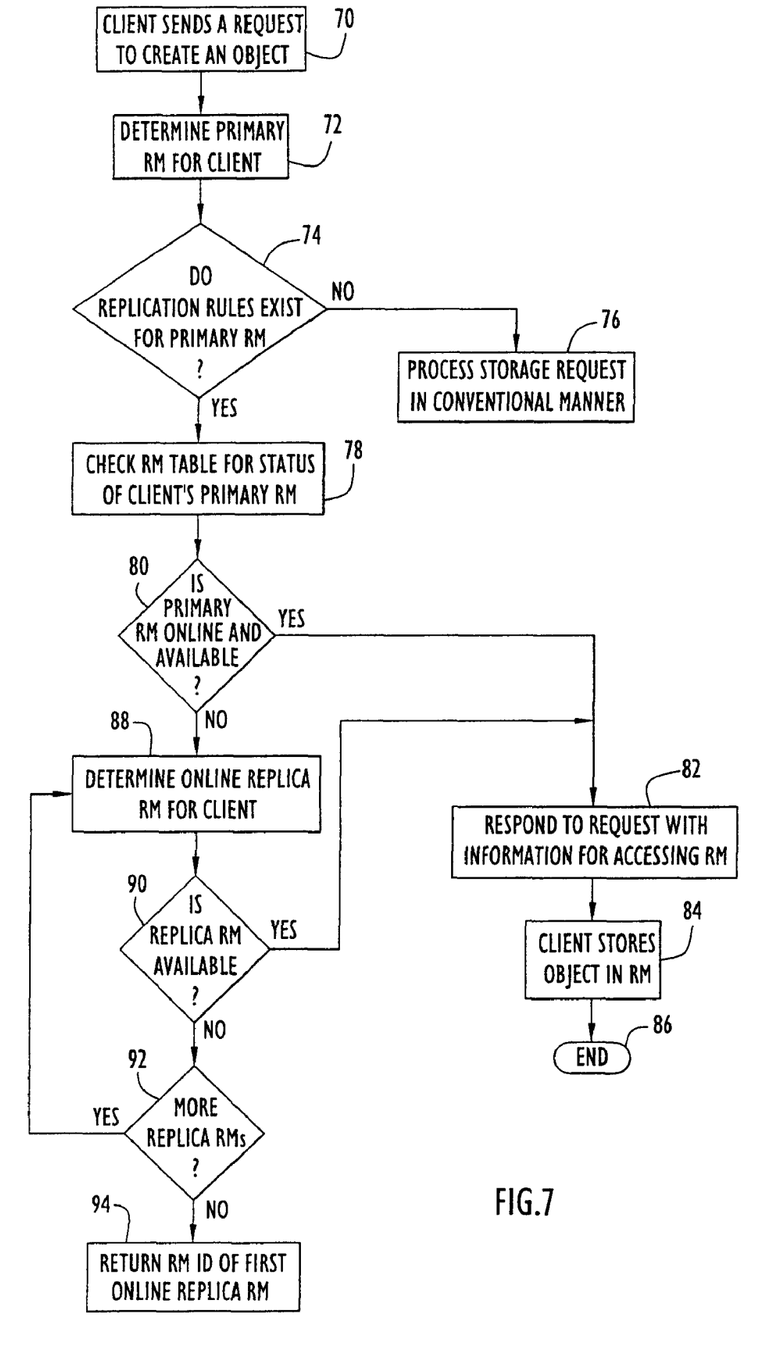
FIG. 7 is a flowchart illustrating a process for creating an object and storing it in the content management system shown in FIG. 4.

A process for creating an object and storing it in a content management system that automatically checks replica resource managers if the primary RM is not available is illustrated in FIG. 7. Referring to FIG. 7, in operation 70 a client sends a request to the library server to create an object for storage within the content management system. In response to receiving the request, the library server determines, in operation 72, the primary resource manager and collection for the client by consulting various tables in the LS database. The library server, through its replica processor unit, queries the source resource manager/collection column in the replica rules table 60, shown in FIG. 5, in operation 74 to determine whether such rules exist for the client's primary resource manager/collection determined in operation 72. If, in operation 74, it is determined that no such replication rules exist for the primary resource manager, then the storage request is processed in a conventional manner in operation 76. If, however, replication rules do exist for the primary resource manager/collection then the resource manager table is checked in operation 78 to determine the status of that primary RM. By the replica processor unit checking the availability column 44 in the resource manager table shown in FIG. 3 for the primary RM, it is determined in operation 80 whether or not the primary resource manager is available. If it is available, then the library server responds to the client's request by providing, in operation 82, information for accessing that available primary resource manager. The client then stores the object in the primary resource manager, in operation 84, and the process ends in operation 86.

However, if the availability information indicates in operation 80 that the primary RM is not available, then in operation 88 the replica processor unit identifies all of the replica RMs that are designated for the requested primary RM and that are online. The replica processor unit checks the availability of those replica RMs based on the status information in the availability column 44 of the RM table. In operation 90 the first replica RM listed in the replica RM column 46 of the RM table is checked to determine if that first replica RM is available and online. If so, the library server responds, in operation 82, to the client's request with information for accessing that replica RM. However, if the first replica RM is not available then the replica processor unit, in operation 92, checks to determine whether there are further online replica RMs. If so, the processor returns to operation 88 and the next online RM is identified. In operation 90 it is then determined whether that next online replica RM is available and if so flow continues with operation 82. However, if that replica RM is not available, then in operation 92, if it is determined that there are no more online replica RMs designated for the primary RM, then the RM ID of the first resource manager in the list that is online is returned in operation 94.

Figure 8:
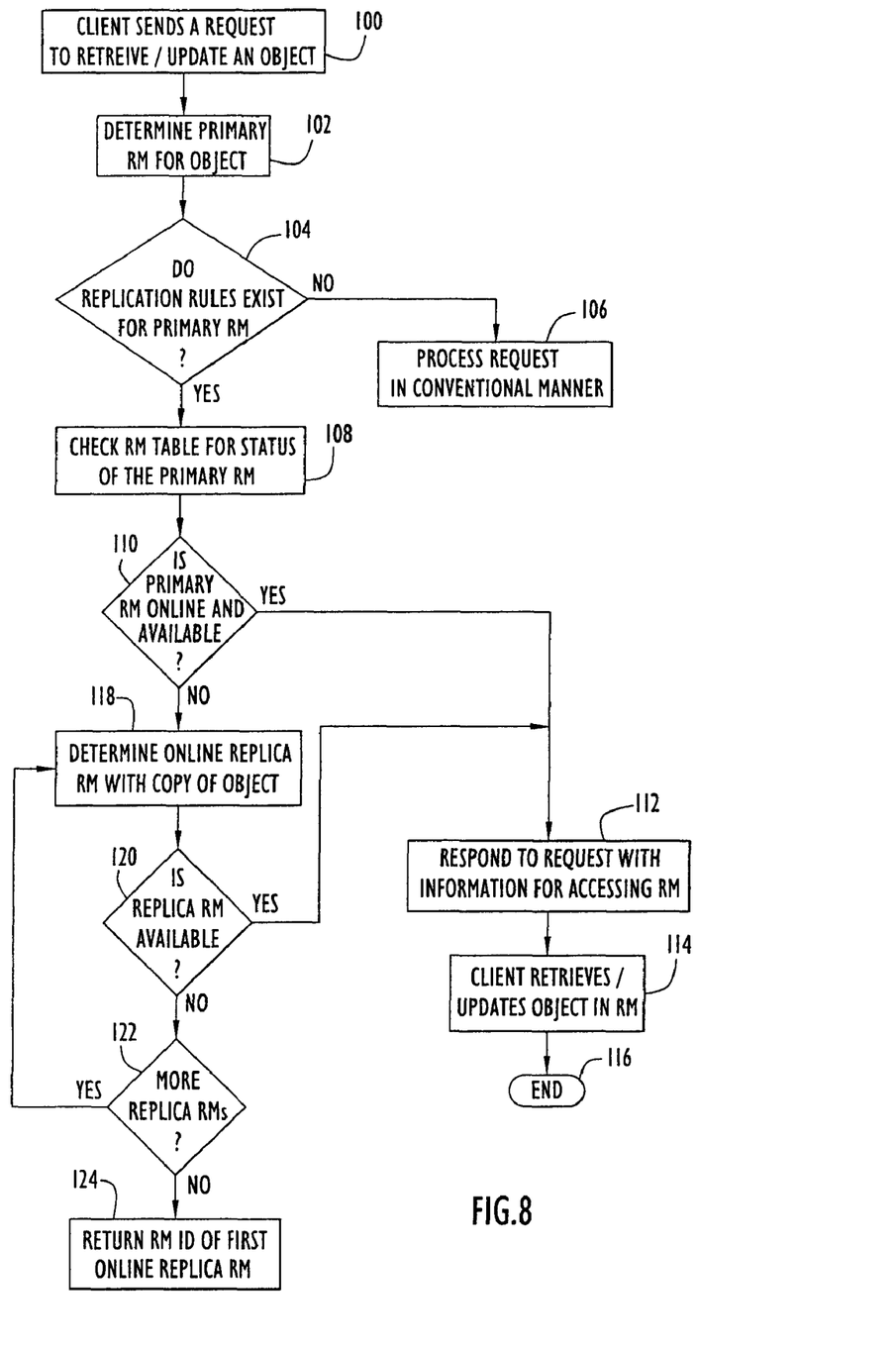
FIG. 8 is a flowchart illustrating a process for retrieving or updating an object from the content management system shown in FIG. 4.

A process similar to the process in FIG. 7 of creating an object is followed when the client retrieves or updates an object already stored within the content management system. Referring to FIG. 8, in operation 100 the client sends a request to the library server to either retrieve or update an object within the content management system. In operation 102, the library server identifies the primary resource manager for the object, by consulting the tables within the LS database. The library server, in operation 104, queries the replica table to determine whether or not replication rules exist for that primary resource manager. If no such rules exist, then the request is processed in a conventional manner in operation 106. However, if replication rules do exist for the primary resource manager where the object is stored, then in operation 108 the library server, by way of its replication processor unit, checks the RM table for the status of the primary resource manager. If the resource manager table indicates, in operation 110, that the primary resource manager is online and available, then the library server responds to the client's request, in operation 112, by returning information necessary for the client to access that resource manager. The client then uses that information, in operation 114, to retrieve or update the object from the resource manager. The process then ends in operation 116.

If, in operation 110, the primary resource manager is determined to be not available, then the replication processor unit within the library server determines if a replica RM exists. If so, in operation 118 a replica RM that is online is identified and in operation 120 it is determined whether that replica RM is available. If so, the library responds to the client's request with information for accessing that replica RM. However, if it is determined in operation 120 that the replica RM is not available, then it is determined in operation 122 whether additional replica RMs that are online are designated for the primary resource manager. If not, the RM ID of the first listed replica RM that is online is returned in operation 124.

Figure 9:
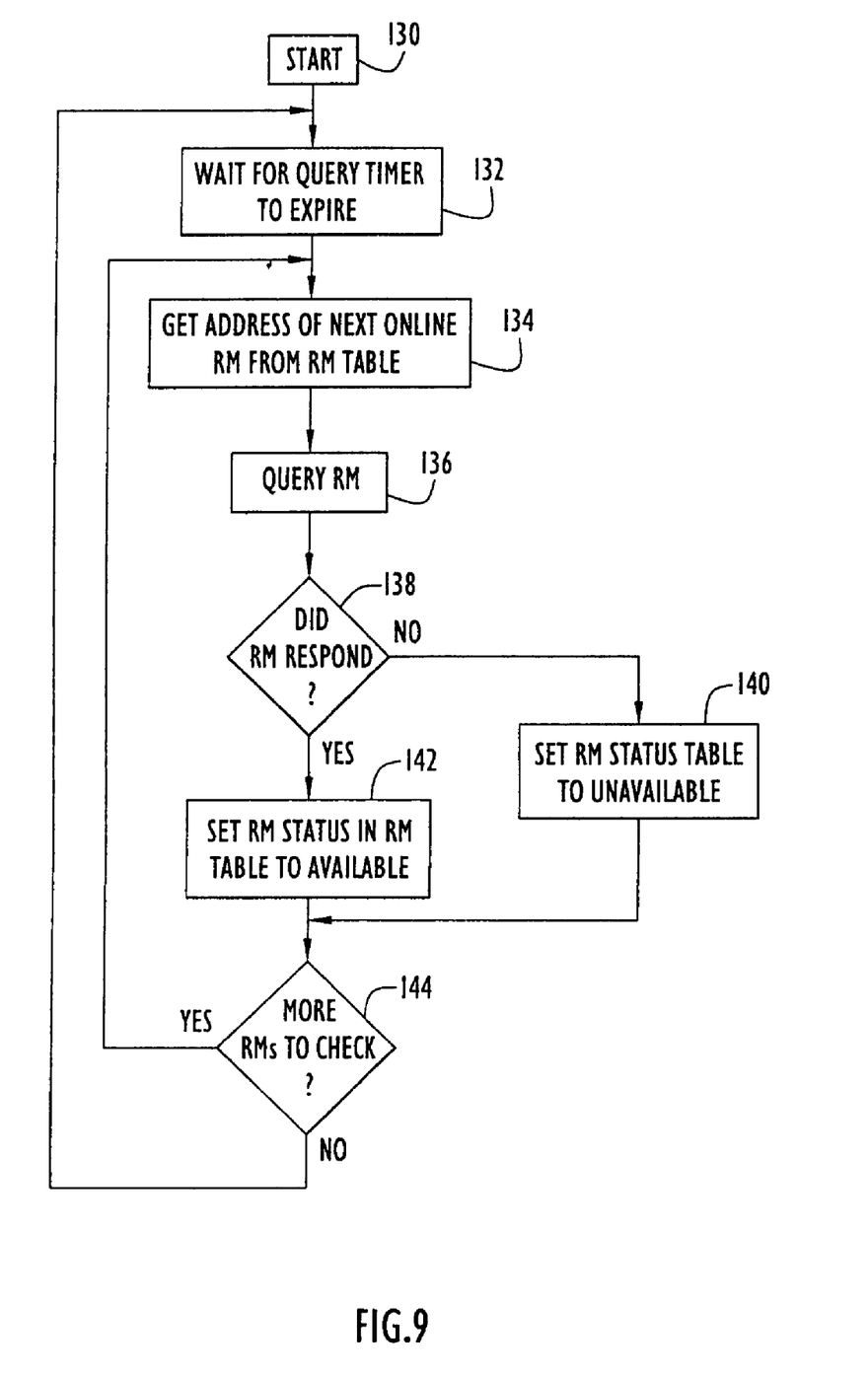
FIG. 9 is a flowchart illustrating a process of a library server automatically detecting if a resource manager becomes unavailable.

The library server can proactively attempt to determine if the resource managers are available by periodically sending a message to determine whether or not they respond. Such an operation is illustrated in FIG. 9. Referring to FIG. 9, this periodic process begins at operation 130 in which the library server determines on a periodic basis whether or not to query a resource manager. Preferably, the library server, at startup, begins a process to periodically query each resource manager. For example, a default querying time can be set to expire in 60 seconds, in response to which the library server queries each of the resource managers in the system.

In operation 132, the library server waits until a query timer has expired, indicating that it is time to query each of the online resource managers.

In operation 134, when it is determined that a query is to be sent, the library server obtains the address of a resource manager that is designated in the resource manager table as being online. An offline status indicates that a system administrator has configured the resource manager intentionally to be unavailable, and accordingly, there is no need to query such offline resource managers.

In operation 136 the library server sends query to the selected resource manager. It is determined in operation 138 whether or not the resource manager responds. For example, if a response is not received from the resource manager in a relatively short period of time, such as 15 seconds, for example, the resource manager is determined to be not available. If a response is not within that timeout period, the library server sets the resource manager status in the availability column 44 of resource manager table 38, shown in FIG. 3, to unavailable in operation 140.

If the RM does respond, then, in operation 142, the library server sets the resource manager status in the RM table to "available." This is illustrated in FIG. 3 in which RM 1 is designated as being available. The library server then determines in operation 144 whether further resource managers are to be checked. If so, the process returns to operation 134 in which the address of the next resource manager that is online is obtained from the resource manager table. If in operation 144 it is determined that no additional resource managers are to be checked, the process returns to operation 132 to wait for the query timer to expire.

Having described apparatuses, articles of manufacture and methods of automatically selecting a replication resource manager in a content management system, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method of accessing a replica of an object in a content management system, wherein the object is stored in a primary resource manager and the replica of the object is stored in a replica resource manager, the method comprising:
   determining if the primary resource manager is available or unavailable by checking a resource manager table, in response to receiving a request for the object from a requestor;
   identifying the replica resource manager by checking the resource manager table when the primary resource manager is determined to be unavailable; and
   sending a response to the requestor with information identifying the replica resource manager.

2. The method according to claim 1, wherein the resource manager table includes information concerning a plurality of resource managers including the primary resource manager having the object stored therein and the replica resource manager, wherein the resource manager table includes availability information for each of the plurality of resource managers and the replica resource manager is identified based on the availability information in the resource manager table.

3. The method according to claim 2, wherein the content management system includes a client that sends the request for the object, and a library server that manages the resource manager table and sends the response to the client, wherein the library server identifies the replica resource manager if the replica resource manager is designated to be accessible.

4. The method according to claim 3, wherein the replica resource manager is designated to be accessible by being designated in the resource manager table as online and available.

5. The method according to claim 2, further comprising determining if the primary resource manager is available by querying the resource manager, and setting an indicator in the resource manager table indicating that the primary resource manager is available if a response to the query is received from the primary resource manager.

6. The method according to claim 1, wherein the replica resource manager is determined to be unavailable based on resource manager status information and without waiting for an access failure timeout event to occur.

7. The method according to claim 6, wherein the request for the object is a request to retrieve the object, and the replica resource manager is identified by consulting a replica table associating the object with the replica resource manager.

8. The method according to claim 7, further comprising determining whether the replica resource manager is unavailable, and if the replica resource manager is unavailable then identifying in the response to the requestor a first replica resource manager that is designated as online.

9. The method according to claim 1, wherein the object is a multimedia object.

10. The method according to claim 1, wherein the replica resource manager is identified based on an availability status information stored in an availability column of the resource manager table.

11. The method according to claim 10, wherein the availability column identifies at least four states for each of the resource manager and the replica resource manger; and
   wherein the at least four states include available, unavailable, online and offline.

12. A program product embodied on a computer-readable medium of instructions for accessing a replica of an object in a content management system, wherein the object is stored in a primary resource manager and the replica of the object is stored in a replica resource manager, the computer-readable medium of instructions comprising:

program instructions for determining if the primary resource manager is available or unavailable by checking a resource manager table, in response to receiving a request for the object from a requestor;

program instructions for identifying the replica resource manager by checking a resource manager table, when the resource manager is determined to be unavailable; and     program instructions for sending a response to the requestor with information identifying the replica resource manager.

13. The program product according to claim 12, wherein the resource manager table includes information concerning a plurality of resource managers including the primary resource manager having the object stored therein and the replica resource manager, wherein the resource manager table includes availability information for each of the plurality of resource managers and the replica resource manager is identified based on the availability information in the resource manager table.

14. The program product according to claim 13, wherein the content management system includes a client that sends the request for the object, and a library server that manages the resource manager table and sends the response to the client, wherein the library server identifies the replica resource manager if the replica resource manager is designated to be accessible.

15. The program product according to claim 14, wherein the replica resource manager is designated to be accessible by being designated in the resource manager table as online and available.

16. The program product according to claim 13, further comprising program instructions for determining if the primary resource manager is available by querying the primary resource manager, and setting an indicator in the resource manager table indicating that the resource manager is available if a response to the query is received from the primary resource manager.

17. The program product according to claim 12, wherein the replica resource manager is determined to be unavailable based on resource manager status information and without waiting for an access failure timeout event to occur.

18. The program product according to claim 17, wherein the request for the object is a request to retrieve the object, and the replica resource manager is identified by consulting a replica table associating the object with the replica resource manager.

19. The program product according to claim 18, further comprising program instructions for determining whether the replica resource manager is unavailable, and if the replica resource manager is unavailable then identifying in the response to the requestor a first replica resource manager that is designated as online.

20. The program product according to claim 12, wherein the object is a multimedia object.

\* \* \* \* \*